2,823,223
Patented Feb. 11, 1958

2,823,223

CHEMICAL PRODUCTS FROM BARK DIGESTED IN AMMONIA

John Charles Steinberg and Kenneth Russell Gray, Shelton, Wash., assignors to Rayonier Incorporated, Shelton, Wash., a corporation of Delaware No Drawing. Application September 19, 1955
Serial No. 535,300

6 Claims. (Cl. 260—473.5)

This invention relates to chemical derivatives from coniferous barks and has for its object the provision of an improved process for the digestion of hemlock and other coniferous barks, and improved derivatives of the barks. The process of the invention comprises the digestion of the bark in aqueous ammonia solutions resulting in the production of soluble derivatives which represent a select fraction of the polyphenolic substance of the bark which has been modified by introduction of organically-combined nitrogen.

It is now known that considerable experimental and development work has been done in the digestion of coniferous barks with aqueous solutions of alkali metal sulfite and bisulfite and hydroxides for the production of bark derivatives. The process of this invention results in the production of a distinctly different product characterized by the fixation of some nitrogen to the bark product, its low ash content, substantial water insolubility when free of ammonia, solubility in aqueous alkali, and other surprising properties as will appear from the following discussion. When the product is dried it contains a little ammonia as the ammonium radical but is largely in the form of free phenolic acids, phlobaphenes and tannins, modified by the presence of some organically bound nitrogen, i. e., nitrogen which is not liberated as ammonia on addition of alkali metal hydroxide.

The ammoniacal bark derivatives of our invention can be used very effectively to replace a substantial portion of the phenol of phenol-formaldehyde resins, and because of their low ash content can be used as intermediates in the production of solvent-soluble phenol-formaldehyde resins which may be used advantageously for laminating electrical insulating materials and the like. The product is also useful as a general-purpose deflocculant in alkaline solutions. The phenolic ammoniacal derivatives can be modified by conversion to a sodium salt either during the processing into a phenolic resin or by adding sodium hydroxide to the extract solution prior to its concentration to displace some of the ammonia and form a water-soluble product.

The invention contemplates the production and utilization of the products in different forms which are advantageous for different commercial uses as follows:

(1) The dilute solution of the extract as initially removed from the bark which contains the bark derivative in the presence of an excess of ammonia. Of course, this form of the bark derivative is water soluble.

(2) The ammoniacal extract concentrated to contain from 20 to 35% of solids. While this product is in a fluid state it does not contain an excess of ammonia and is approximately neutral in pH. It apparently consists of a mixture of dispersed and dissolved material.

(3) A dried product which is a fine dark brown powder, substantialy insoluble in water which yields a pH of about 5 when slurried in water, and still contains some ammonia present as the ammonium radical in the material. This product is soluble in aqueous alkaline solutions and has many commercial uses, notably as a substitute for phenol in phenol-formaldehyde adhesive resins.

The bark of western hemlock (*Tsuga heterophylla*), and other coniferous trees contain as major phenolic constituents phlobatannins which are considered to be polymers of catechins or of other polyhydroxy aromatic material, a relatively water-insoluble polyhydroxy aromatic materials resembling phlobatannins but which probably have higher molecular weights and are known as phlobaphenes, and phenolic acids, as well as an aromatic polymer high in methoxyl but relatively low in phenolic hydroxyl content, resembling wood lignin. Under the conditions of the invention, however, very little of the highly methoxylated material will be extracted.

In carrying out a process of the invention, the bark in a suitable state of subdivision is digested in an aqueous ammonia solution with from 0.02 to 1.5 pounds of ammonia per pound of bone dry bark, at a temperature of from 17° to 170° C. for from 15 to 240 minutes. In our preferred and most advantageous operating conditions from a consideration of quality, yield and the economical use of ammonia, we use from 0.1 to 0.25 pound of ammonia per pound of bone dry bark, at a temperature of from 97° to 170° C., specifically in the neighborhod of 150° C. and for from 30 to 40 minutes.

At the higher temperatures of the range, the shorter reaction time and lower chemical to bark ratios would be used. At the low temperatures of the range, high ammonia to bark ratios and longer reaction times would be used. Variations in the process conditions will effect some difference in the content of organically combined nitrogen and phenolic hydroxyl as will appear in the following tables.

In the preferred embodiment of our process, excess ammonia is usually employed and in this respect it differs from the caustic soda extraction process where, to achieve selectivity in extraction, the NaOH was limited to less than that which would react with the bark substance.

The bark from trees is usually obtained in large pieces which, for the purpose of digestion in the process, should be comminuted to aid penetration of the reacting ammoniacal solution. The particle size is not critical, but is preferably subdivided so the bulk of the material will pass through a screen of about 4 meshes to the inch and be retained by a screen of about 20 meshes to the inch. Suitable subdivision may be accomplished by conventional means as by a hammermill or attrition mill.

In carrying out a process of the invention, the subdivided bark is charged into a reaction digester to form a reaction mixture comprising about 10% to about 20% of bark based on its equivalent oven-dry weight and aqueous ammoniacal solution containing from 0.2% to 29% of ammonia and in the ratios of ammonia to bark aforementioned. In general, it is desirable, but not essential, to agitate the charge in the digester, although continuous mixing reduces somewhat the time of reaction. In any event, the digestion equipment and physical condition of the bark must be capable of bringing the bark material and water solution of ammonia into intimate contact. The reaction is preferably conducted in a closed pressure vessel. The digestion may be carried out either continuously or batchwise in a single stage or in a multiplicity of stages.

Following the digestion, the new bark derivatives are obtained in the most practical manner as well as in highest yield and least dilution by expressing them from the treated bark by pressing, which separates from the solid, residual portion of the bark a solution comprising both soluble material which could readily be separated from the residual bark by draining as well as high molecular weight soluble material which, in view of very low diffusion rates, could be removed from the bark only by lengthy and excessive washing if the digested bark were merely lixiviated as, for example, on a filter. Lixiviation, or filtration followed by lixiviation, while considerably less efficient than expressing (in regard to time required and dilution of the product solution) may, however, be used. The product solutions usually contain a small amount of insoluble material such as bark in fine subdivision which, in certain applications such as in the manufacture of plywood adhesives, may be removed as by filtration. The compounds occurring in the solution obtained by expressing or lixiviation may be used in that form with accompanying excess ammonia, or in a concentrated solution in which case the excess ammonia is substantially removed by evaporation or in a dry pulverulent state. Concentration of the solution from the digestion may be effected by known methods of evaporation, either at reduced or atmospheric pressure. The solid products may be produced by known methods such as spray drying or drum drying, conducted at atmospheric or reduced pressures, again preferably avoiding high temperatures for prolonged periods and oxidizing conditions which would affect the extracted polyphenolic material when further reactions are not desired. In spray drying, high temperature air or flue gas of the order 350–600° F. may be satisfactory because the period of contact is very brief.

The economy of the process is enhanced by recovering the free ammonia in the expressed solution either prior to or during evaporation as, for example, by stripping with steam followed by cooling and absorption of the vapors from the stripping operation. The extent of ammonia recovery is increased when the bark extract is converted to the sodium derivative by reaction with sodium hydroxide. Ammonia can also be recovered from the vapor which flashes when the digestion products are discharged from the digester.

The copending patent application of Franklin W. Herrick and Louis H. Bock, Serial No. 539,933, filed October 11, 1955, describes and claims the bark derivatives which are water-soluble sodium salts of the dissolved bark substance, formed by reacting the ammoniacal bark derivatives with, for example, from 10–25% of sodium hydroxide based on the bark derivative compounds, and the copending patent application of Franklin W. Herrick and Louis H. Bock, Serial No. 539,011, filed October 6, 1955, now abandoned, described and claims phenol-formaldehyde resinous products containing the sodium hydroxide-modified bark derivatives.

The following Tables I to V give the results obtained by digesting western hemlock bark in an enclosed digester for the time, temperature and ammonia to bark ratios listed in the tables. The bark from green logs was subdivided by means of a hammermill to pass through a 4 mesh to the inch screen and be retained on a 20 mesh to the inch screen. In the tables, "B. D." refers to bone dry bark.

In making the determinations for the percentage of phenolic hydroxyl shown in the following tables, a modification of the method of Drs. Maranville and Goldschmid was used. This method is described in Analytical Chemistry 26, 1423–27, September 1954, in an article entitled "Ultraviolet absorption spectra as a measure of phenolic hydroxyl group content in polyphenolic tannin-like materials." In this modification, the solvent for the acid reference solution is acidified 1:1 ethanol instead of acidified pH 10 buffer solution.

Combined nitrogen, as listed in said tables and referred to in the specification as "organically combined nitrogen" comprises the difference between the value for total nitrogen determined by the Kjeldahl method (using sulfuric acid digestion) and the value for ammoniacal nitrogen determined by titration of the ammonia liberated with sodium hydroxide.

TABLE I

[Variable: Ammonia to Bark Ratio. Constants: 30 minutes at 150° C.

| Extract No. | Series No. | NH₃:Bark | Yield, Percent of B. D. Bark | Extract Analyses |  | Phenolic Hydroxyl, Percent |
|---|---|---|---|---|---|---|
| | | | | Nitrogen, Percent | | |
| | | | | Total | Combined | |
| 1 | 1 1 | 0.027 | 20.3 | 2.9 | 1.2 | 7.6 |
| 2 | | 0.055 | 21.5 | 3.5 | 2.3 | 7.0 |
| 3 | | 0.110 | 27.4 | 3.9 | 1.6 | |
| 4 | 1 2 | 0.219 | 30.5 | 4.2 | 3.4 | 5.2 |
| 5 | | 0.020 | 20.5 | 2.8 | 0.9 | 8.7 |
| 6 | | 0.050 | 23.5 | 3.8 | 1.5 | 7.8 |
| 7 | 2 3 | 0.100 | 26.4 | 4.2 | 1.9 | 7.3 |
| 8 | | 0.200 | 32.5 | 4.7 | 2.6 | 6.4 |
| 9 | | 0.400 | 38.6 | 4.4 | 2.9 | 5.3 |

¹ Bark hydraulically removed from salt-water-floated logs, washed.
² Bark peeled from non-salt-water-floated logs, unwashed.

TABLE II

[Variable: Maximum Extraction Temperature. Constants: 30 minutes at Maximum Temp., unwashed bark.]

| Extract No. | Series No. | Max. Temp., °C. | Yield, Percent of B. D. Bark | Extract Analyses | | Phenolic Hydroxyl, Percent |
|---|---|---|---|---|---|---|
| | | | | Nitrogen, Percent | | |
| | | | | Total | Combined | |
| 1 | 1 1 | 150 | 26.4 | 4.2 | 1.9 | 7.3 |
| 2 | | 170 | 25.0 | 3.7 | 2.3 | 4.8 |
| 3 | 2 2 | 150 | 38.6 | 4.4 | 2.9 | 5.3 |
| 4 | | 170 | 35.8 | 4.6 | 3.5 | 2.5 |

¹ NH₃:bark=0.10.
² NH₃:bark=0.40.

TABLE III

[Variable: Extraction Time. Constants: Unwashed Bark.]

| Extract No. | Series No. | Extraction Time, min. | | Yield, percent of B. D. bark | Extract Analyses | | Phenolic Hydroxyl, percent |
|---|---|---|---|---|---|---|---|
| | | At max. temp. | Total | | Nitrogen, percent | | |
| | | | | | Total | Combined | |
| 1 | 1 1 | 30 | 45 | 32.5 | 4.7 | 2.6 | 6.4 |
| 2 | | 120 | 239 | 34.3 | 5.3 | 3.2 | 2.5 |
| 3 | | 15 | 27 | 27.6 | 3.9 | 1.9 | 7.7 |
| 4 | 2 2 | 30 | 47 | 26.4 | 4.2 | 1.9 | 7.3 |
| 5 | | 60 | 71 | 27.6 | 3.9 | 1.9 | 6.2 |
| 6 | 3 3 | 30 | 48 | 25.0 | 3.7 | 2.3 | 4.8 |
| 7 | | 60 | 77 | 27.0 | 3.4 | 1.9 | 3.5 |

¹ NH₃:bark=0.200, max. temp.=150° C.
² NH₃:bark=0.100, max. temp.=150° C.
³ NH₃:bark=0.100, max. temp.=170° C.

TABLE IV
Miscellaneous extracts

| Ext. No. | Bark | | NH$_3$:Bark | Max. Temp., °C. | Total—Time at Max. Temp., min. | Yield, percent of B. D. bark | Extract Analyses | | Phenolic Hydroxyl, percent |
| --- | --- | --- | --- | --- | --- | --- | --- | --- | --- |
| | Western Hemlock, percent | Amabilis Fir, percent | | | | | Nitrogen, percent | | |
| | | | | | | | Total | Comb. | |
| 1 | ¹100 | 0 | 0.027 | 97 | 120 | 22.4 | 2.4 | 0.6 | 8.0 |
| 2 | ¹100 | 0 | ⁴1.50 | 17 | 60 | 16.3 | 3.2 | 1.0 | 6.8 |
| 3 | ²85 | ²15 | 0.11 | 150 | 30 | 26.1 | 4.2 | 2.2 | 7.1 |
| 4 | ³100 | 0 | 0.10 | 150 | 30 | 21.1 | 3.8 | 2.0 | 8.0 |

¹ Bark peeled from non-salt-water-floated logs, unwashed.
² Bark hydraulically removed from salt-water-floated logs, washed.
³ Bark peeled from non-salt-water-floated logs, washed.
⁴ Extraction made with 29% NH$_4$OH solution.

The following table shows the effect of varying the bark particle size:

TABLE V
[Variable: Bark Particle Size. Constants: 30 minutes at 150° C.]

| Ext. No. | Ser. No. | Bark Grinding | | Yield, percent of B. D. bark | Extract Analyses | | Phenolic Hydroxyl, percent |
| --- | --- | --- | --- | --- | --- | --- | --- |
| | | Equipment | Part. Size | | Nitrogen, percent | | |
| | | | | | Total | Comb. | |
| 1 | ¹1 | Gruendler hog | coarse | 15.9 | 3.4 | 2.9 | 5.8 |
| 2 | | Hammermill | medium | 21.5 | 3.5 | 2.3 | 7.0 |
| 3 | ²2 | Hammermill | medium | 26.4 | 4.2 | 1.9 | 7.3 |
| 4 | | Wiley mill | fine | 28.4 | 3.6 | 1.9 | 7.3 |

¹ Bark hydraulically removed from salt-water-floated logs, unwashed, NH$_3$:bark=0.055.
² Bark peeled from non-salt-water-floated logs, unwashed, NH$_3$:bark=0.100.

It is believed that the high reactivity and other novel properties of the ammonia extracts are, in part, a result of these extracts containing combined nitrogen in reactive form. While we do not know the manner in which nitrogen is combined with polyphenolic bark material, it may represent a partial conversion of the structure of the extracted polyphenolic material to amino phenols or to iminoquinone compounds.

We claim:

1. The chemical bark derivative resulting from the digestion of coniferous bark in an aqueous ammonia solution containing from 0.02 to 1.5 pounds of ammonia per pound of bone dry bark, for at least 15 minutes, at a temperature of from 17° to 170° C., said derivative containing some organically combined nitrogen.

2. The bark derivative as defined in claim 1 in an aqueous solution containing some ammonia.

3. The dry chemical bark derivative resulting from the digestion of coniferous bark in an aqueous ammonia solution containing from 0.02 to 1.5 pounds of ammonia per pound of bone dry bark, for from 15 to 240 minutes, at a temperature of from 17° to 170° C., said derivative containing some organically combined nitrogen, said derivative being relatively free of ammonia, having a pH of about 5 when slurried in water and being substantially insoluble in water.

4. The process of producing chemical bark derivatives from coniferous bark which comprises digesting the bark in a state of subdivision in an aqueous ammonia solution containing from 0.1 to 0.25 pound of ammonia per pound of bone dry bark, at a temperature of from 97° to 170° C., for from 30 to 40 minutes, and separating from the bark an aqueous solution of the resulting bark derivative.

5. The process of producing chemical bark derivatives from coniferous bark which comprises digesting the bark in a state of subdivision in an aqueous ammonia solution containing from 0.02 to 1.5 pounds of ammonia per pound of bone dry bark, for at least 15 minutes, at a temperature of from 17° to 170° C. and separating the chemical bark derivative from the solution and resulting bark residue.

6. In the process of claim 5, separating the chemical bark derivative contained in the solution by evaporation of water along with some ammonia.

References Cited in the file of this patent

UNITED STATES PATENTS

| 836 | Hayes | July 12, 1838 |
| --- | --- | --- |
| 2,676,980 | Tu | Apr. 27, 1954 |